(12) United States Patent
Pang et al.

(10) Patent No.: US 10,574,627 B2
(45) Date of Patent: Feb. 25, 2020

(54) DYNAMIC ORTHOGONAL LOCAL DHCP IP POOLS FOR WIRELESS ACCESS POINTS

(71) Applicant: Cisco Technology, Inc., San Jose, CA (US)

(72) Inventors: Tak Ming Francis Pang, Palo Alto, CA (US); Bo Yang, San Jose, CA (US); Maruth N. Kamath, Sunnyvale, CA (US); Xinggang Zhou, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/914,522

(22) Filed: Mar. 7, 2018

(65) Prior Publication Data

US 2019/0281011 A1  Sep. 12, 2019

(51) Int. Cl.
*H04L 29/12* (2006.01)
*H04W 76/10* (2018.01)
*H04W 84/12* (2009.01)
*H04W 88/08* (2009.01)

(52) U.S. Cl.
CPC ...... *H04L 61/2015* (2013.01); *H04L 61/2061* (2013.01); *H04W 76/10* (2018.02); *H04L 61/256* (2013.01); *H04L 61/6022* (2013.01); *H04W 84/12* (2013.01); *H04W 88/08* (2013.01)

(58) Field of Classification Search
CPC ............. H04L 61/2015; H04L 61/2061; H04L 61/256; H04L 61/6022; H04W 76/10; H04W 84/12; H04W 88/08
See application file for complete search history.

(56) References Cited

U.S. PATENT DOCUMENTS

| 7,463,607 | B2 | 12/2008 | Sood et al. |
| 8,027,324 | B2 | 9/2011 | Kalika et al. |
| 8,755,385 | B2 | 6/2014 | Popa et al. |
| 8,949,454 | B2 | 2/2015 | Venkatachalam et al. |

(Continued)

OTHER PUBLICATIONS

Grochla, et al., "Autoconfiguration procedures for multiradio wireless mesh networks based on DHCP protocol", IEEE, Jun. 15-19, 2009, 6 pgs.

*Primary Examiner* — Michael Thier
*Assistant Examiner* — Nevena Zecevic Sandhu
(74) *Attorney, Agent, or Firm* — Edell, Shapiro & Finnan, LLC

(57) ABSTRACT

An access point (AP) operates in a network of APs, each configured with a distinct IP address with which to communicate with a wide area network (WAN), and each configured to connect wirelessly with wireless client devices seeking access to the WAN via the each AP. The AP derives, based on the distinct IP address, a standalone pool of IP addresses for assignment to wireless client devices, such that the IP addresses do not overlap with IP addresses of any other standalone pool of IP addresses derived by any other of the APs; The AP operates in a standalone mode to: receive from wireless client devices connecting with the AP respective requests for IP addresses for use by the wireless client devices; and responsive to each request, dynamically assign to the wireless client device that sent the request a respective IP address from the standalone pool of IP addresses.

20 Claims, 6 Drawing Sheets

(56) References Cited

U.S. PATENT DOCUMENTS

| | | | |
|---|---|---|---|
| 2005/0030945 A1* | 2/2005 | Sarikaya | H04L 29/12311 |
| | | | 370/389 |
| 2009/0185536 A1 | 7/2009 | Sood et al. | |
| 2011/0235627 A1 | 9/2011 | Wang | |
| 2013/0007233 A1 | 1/2013 | Lv et al. | |
| 2015/0334537 A1* | 11/2015 | Kathuria | H04W 80/06 |
| | | | 370/312 |
| 2017/0142636 A1 | 5/2017 | Joshi et al. | |
| 2017/0156052 A1* | 6/2017 | Yun | H04L 61/2007 |
| 2017/0163597 A1 | 6/2017 | Amerneni et al. | |
| 2017/0195282 A1* | 7/2017 | Teng | H04L 61/2061 |

* cited by examiner

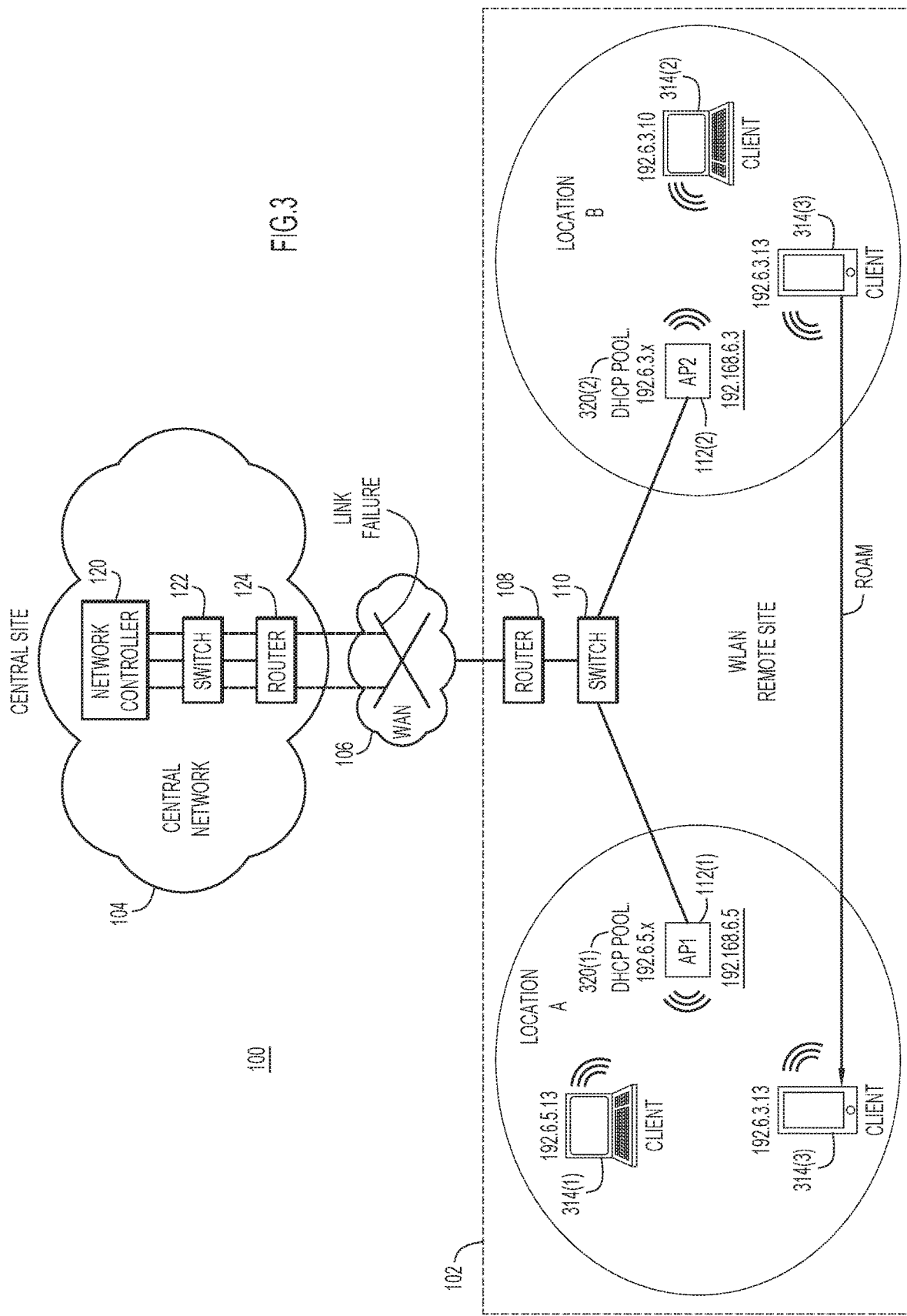

FOR EACH AP, USE LAST 3 BYTES OF AP IP ADDRESS AS PREFIX (24 BIT MASK) FOR DHCP POOL THE AP:

AP1 (172.31.255.101/24) POOL 1 (31.255.101.x) WITH 254 ADDRESSES FOR CLIENTS IN EACH SUBNET

AP2 (172.31.255.102/24) POOL 2 (31.255.102.x) WITH 254 ADDRESSES FOR CLIENTS IN EACH SUBNET

AP3 (172.30.255.100/24) POOL 3 (30.255.100.x) WITH 254 ADDRESSES FOR CLIENTS IN EACH SUBNET

FIG.4

FOR EACH AP, USE "10" (PRIVATE ADDRESS) AS FIRST BYTE, AND ADD LAST 2 BYTES FROM AP IP ADDRESS AS PREFIX FOR DHCP POOL:

AP1 (172.31.255.101/24) POOL 1 (10.255.101.x) WITH 254 ADDRESSES FOR CLIENTS IN EACH SUBNET

AP2 (172.31.255.102/24) POOL 2 (10.255.102.x) WITH 254 ADDRESSES FOR CLIENTS IN EACH SUBNET

AP3 (172.30.255.100/24) POOL 3 (10.255.100.x) WITH 254 ADDRESSES FOR CLIENTS IN EACH SUBNET

FIG.5

DYNAMIC ORTHOGONAL LOCAL DHCP IP POOLS FOR WIRELESS ACCESS POINTS

TECHNICAL FIELD

The present disclosure relates to assigning Internet Protocol (IP) addresses to wireless client devices.

BACKGROUND

A wireless access point (AP) operates in a non-standalone mode under control of a network controller that hosts or has access to a central Dynamic Host Configuration Protocol (DHCP) server. When wireless clients connect to the AP, the wireless clients receive DHCP IP addresses from the network controller via the AP. When the wireless clients employ the DHCP IP addresses for network traffic that transits the AP, the AP performs network address translation (NAT) and port address translation (PAT) (NAT/PAT) on the DHCP IP addresses. When the AP loses connectivity with the network controller, the AP may operate in a limited standalone mode. In the limited standalone mode, APs cannot perform NAT/PAT because new clients do not receive IP addresses from the central DHCP server. This presents a problem in deployments in which APs are expected to operate in the standalone mode most of the time. When APs attempt to provide DHCP addresses locally (i.e., at the AP) to wireless clients without the interacting with the network controller, the APs may assign the same IP address to multiple wireless clients at the same time, which results in deleterious IP address collisions, especially when wireless clients roam between the APs. Manual configuration of different DHCP IP address pools on different APs for use in the standalone mode is prohibitively time consuming and error-prone.

BRIEF DESCRIPTION OF THE DRAWINGS

FIG. 3 is an illustration of the network environment after the network controller loses connectivity with the APs, and the APs begin to assign IP addresses to wireless client devices from non-overlapping/orthogonal standalone (i.e., local) DHCP pools of IP addresses derived by the APs, according to an example embodiment.

FIG. 4 is an illustration of a method of deriving non-overlapping local DHCP pools of IP addresses for multiple APs, according to an example embodiment.

FIG. 5 is an illustration of another method of deriving non-overlapping local DHCP pools of IP addresses for multiple APs, according to an example embodiment.

DESCRIPTION OF EXAMPLE EMBODIMENTS

Overview

An access point (AP) operates in a network of APs, wherein each AP is configured with a distinct Internet Protocol (IP) address with which to communicate with a wide area network (WAN), and each AP is configured to connect wirelessly with wireless client devices seeking access to the WAN via the each AP. The AP derives, based on the distinct IP address, a standalone pool of IP addresses for assignment to wireless client devices, such that the IP addresses do not overlap with IP addresses of any other standalone pool of IP addresses derived similarly by any other of the APs from the distinct IP address configured on the any other of the APs. The AP operates in a standalone mode to: receive from wireless client devices connecting with the AP respective requests for IP addresses for use by the wireless client devices; and responsive to each request, dynamically assign to the wireless client device that sent the request a respective IP address from the standalone pool of IP addresses.

EXAMPLE EMBODIMENTS

Figure 1:
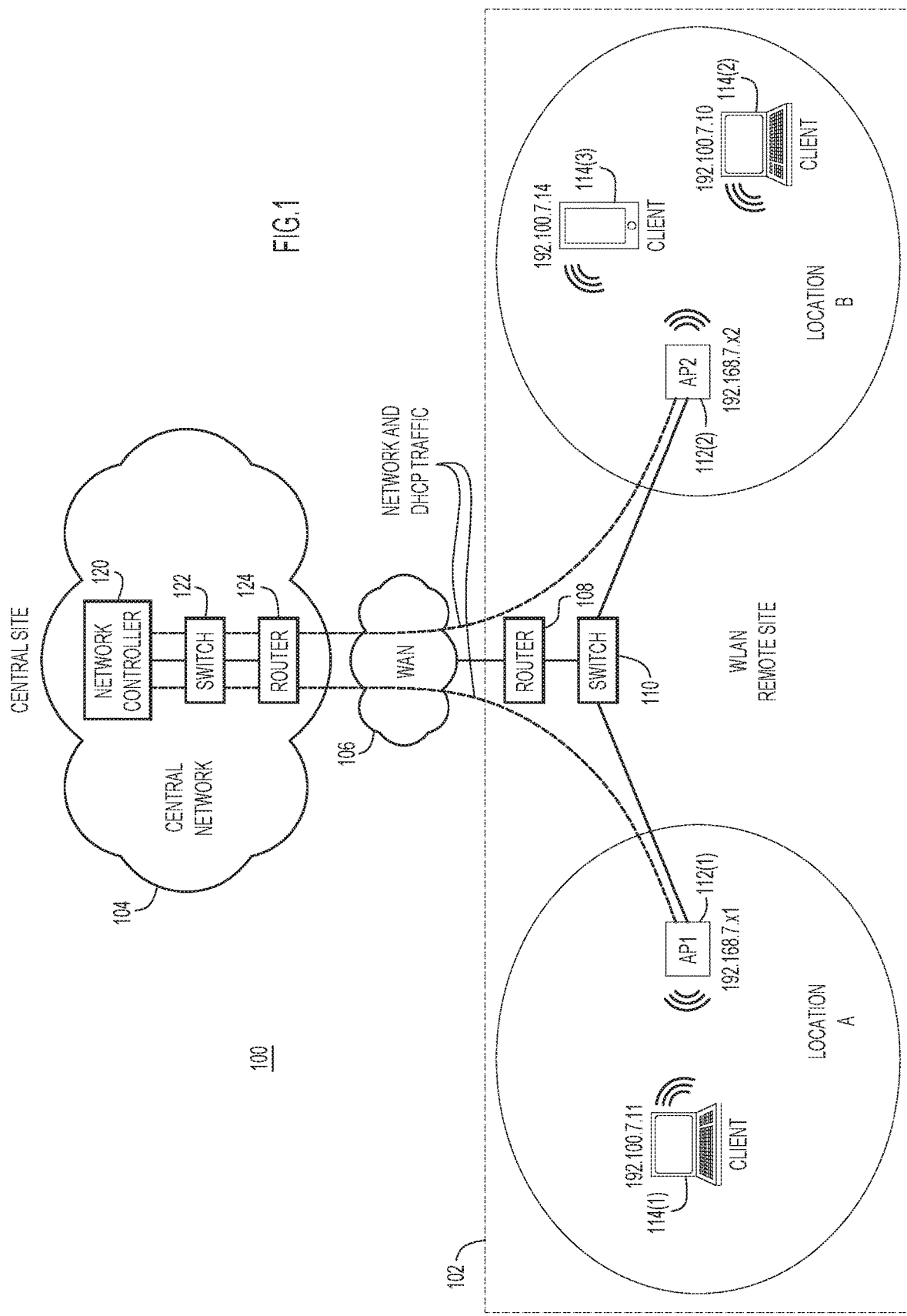
FIG. 1 is a block diagram of a network environment in which a network controller assigns DHCP IP addresses to wireless client devices connected to wireless APs, according to an example embodiment.

Referring first to FIG. 1, there is shown a block diagram of an example network environment 100 in which DHCP IP addresses are assigned to wireless client devices connected to wireless APs. Network environment 100 includes a wireless local area network (LAN) (WLAN) 102 at a remote site, a central network 104 at a central site, and a wide area network (WAN) 106 (e.g., the Internet) connected to the remote site WLAN and the central network. Central network 104 may include one or more LANs or WLANs. At the remote site, WLAN 102 includes a router (R) 108 connected to WAN 106, a switch (S) 110 connected to the router, and a network of wireless APs 112(1) and 112(2) (collectively referred to as "APs 112") connected to the switch through either wired or wireless communication links. APs 112(1) and 112(2) are also referred to as "AP1" and "AP2," respectively. As shown in FIG. 1, APs 112(1) and 112(2) reside at physically separate locations A and B, respectively. For example, APs 112(1) and 112(2) may reside on different floors of a building.

In the example of FIG. 1, the network of wireless APs (i.e., the "AP network") is configured according to a tree-topology in which switch 110 forms a root of the tree and APs 112 form leaves or terminal nodes connected to the root. Thus, APs 112 communicate with WAN 106 through switch 110 and router 108, or other APs, not shown in FIG. 1. The topology of the AP network depicted in FIG. 1 represents a non-limiting example; other topologies are possible. For example, APs 112 may represent children APs of multiple parent APs that form the root of the network, and the APs may communicate with each other using wired or wireless links, which may include wireless backhaul links. The embodiments presented herein apply equally well to all such topology variations.

Each AP 112(i) provides to wireless client devices (also referred to as "wireless clients" or simply "clients") that are served by the AP access to WAN 106. To this end, each AP 112(i) communicates wirelessly with wireless clients in WLAN 102 served by that AP. APs 112 may provide access to the wireless clients over wireless access links in accordance with any of the IEEE 802.11 protocols, for example. In the example of FIG. 1, AP 112(1) communicates with a wireless client 114(1) in WLAN 102 served by the AP.

Similarly, AP 112(2) communicates with wireless clients 114(2) and 114(3) in WLAN 102.

Central network 104 includes a network controller device 120 (also referred to simply as a "network controller 120" and a "WLAN controller 120"), a switch 122 connected to the network controller, and a router 124 connected to switch 122 and WAN 106. Thus, network controller 120 communicates with WAN 106 through switch 122 and router 124. Network controller 120 normally operates as a central controller of APs 112 to configure and control the functionality of the APs, assist with configuring wireless clients through the APs, and in some arrangements, route data traffic (referred to as "traffic") associated with each AP to and from WAN 106. To route traffic, network controller 120 serves as a focal point for each AP through which traffic to and from the AP is routed. Such traffic includes data packets (e.g., IP packets) from a wireless client served by the AP and destined for WAN 106 (e.g., the Internet), or data packets from the Internet destined for the client. An AP-network controller protocol, such as the Control and Provisioning of Wireless Access Points (CAPWAP) protocol, described in large part in RFC 5415, may be used between each of APs 112(*i*) and network controller 120 to enable the network controller to perform the aforementioned control and AP traffic routing functions with respect to each AP, although other wireless network control protocols are possible.

Network controller 120 also hosts or relays requests to a central DHCP server (not shown in FIG. 1), which maintains a central pool of available, distinct IP addresses. When APs 112 establish respective connections to/connectivity with network controller 120, the APs enter into a "non-standalone" mode of operation in which the APs operate under control of the network controller. While in the non-standalone mode, each AP 112(*i*) monitors its connectivity status with network controller 120 using, for example, an exchange of periodic heart-beat messages with the network controller; the presence and absence of the heart-beat messages from the network controller indicate connectivity and loss of connectivity with the network controller, respectively.

Also, before APs 112 provide wireless network access/services to wireless clients 114, a local DHCP server hosted on router 108 or switch 110 assigns respective, distinct IP addresses (i.e., configures each AP with its respective distinct IP address), so that the APs may use their assigned IP addresses to communicate with other IP networks, such as WAN 106, or network controller 120. Alternatively, a network administrator may manually configure APs 112 with respective, static, distinct IP addresses according to an IP subnet configuration on router 108. Additionally, so long as APs 112 and network controller 120 maintain connectivity with each other, and so long as the APs continue to operate in the non-standalone mode, the central DHCP server dynamically assigns from the central pool of IP addresses respective IP addresses to wireless clients 114 as they associate with/connect to APs 112. That is, when each wireless client 114 associates with one of APs 112, the wireless client exchanges DHCP transactions with the central DHCP server via the AP to which the client device is connected (referred to as the "connected AP") to (i) request from the central DHCP server an IP address (i.e., an DHCP IP address), and then (ii) receive from the central DHCP server in response to the request for the IP address an assigned IP address (i.e., an assigned DHCP IP address) to be used by the wireless client for subsequent communications with an IP network.

Once wireless clients 114 receive the above-mentioned IP addresses assigned to the wireless clients by the central DHCP server, the wireless clients use their IP addresses to communicate with WAN 106 through APs 112. That is, wireless clients 114 send network traffic (i.e., data packets) to WAN 106 through APs 112, and receive network traffic from the WAN through the APs. APs 112 each perform network address translation (NAT) and port address translation (PAT) (NAT/PAT) on the network traffic flowing through/transiting the AP. More specifically, the NAT/PAT translates, for each network packet originated by a wireless client and destined for WAN 106, the wireless client IP address (assigned by the central DHCP server) and Transmission Control Protocol (TCP)/User Data Protocol (UDP) port address to a public-facing wireless client IP address and TCP/UDP port address. In the opposite direction, the NAT/PAT performs a reverse translation. That is, the NAT/PAT translates, for each network packet originated in the WAN and destined for the wireless client, the public-facing wireless client IP address and TCP/UDP port address to the wireless client IP address (as assigned by the DHCP server) and TCP/UDP port address.

So long as network controller 120 maintains connectivity with all of APs 112 (which therefore continue to operate in their non-standalone modes), the network controller maintains a complete/system view of the controlled network, including all of the APs and all of the wireless clients connected to the APs, and correspondingly maintains a current knowledge of which IP addresses are assigned to which APs and to which wireless client devices. This enables network controller 120 to avoid assigning overlapping (i.e., the same) IP addresses to different wireless clients/APs, which might cause deleterious IP address collision, especially when mobile wireless clients roam from one AP to another.

FIG. 1 represents an operational scenario in which the local DHCP server on router 108 has assigned IP address 192.168.7.x1/24 to AP 112(1) and a different IP address 192.168.7.x2/24 to AP 112(2), such that both of the APs operate on the same IP subnet. The central DHCP server has (i) assigned IP address 192.100.7.11 to wireless client 114(1) via AP 112(1), and (ii) assigned IP addresses 192.100.7.10 and 192.100.7.14 to wireless client 114(2) and mobile wireless client 114(3), respectively, via AP 112(2). Accordingly, the central DHCP server has assigned different IP addresses to all of wireless client devices 114, thus avoiding any potential IP address collisions if/when mobile wireless client 114(3) roams from AP 112(1) to AP 112(2).

Figure 2:
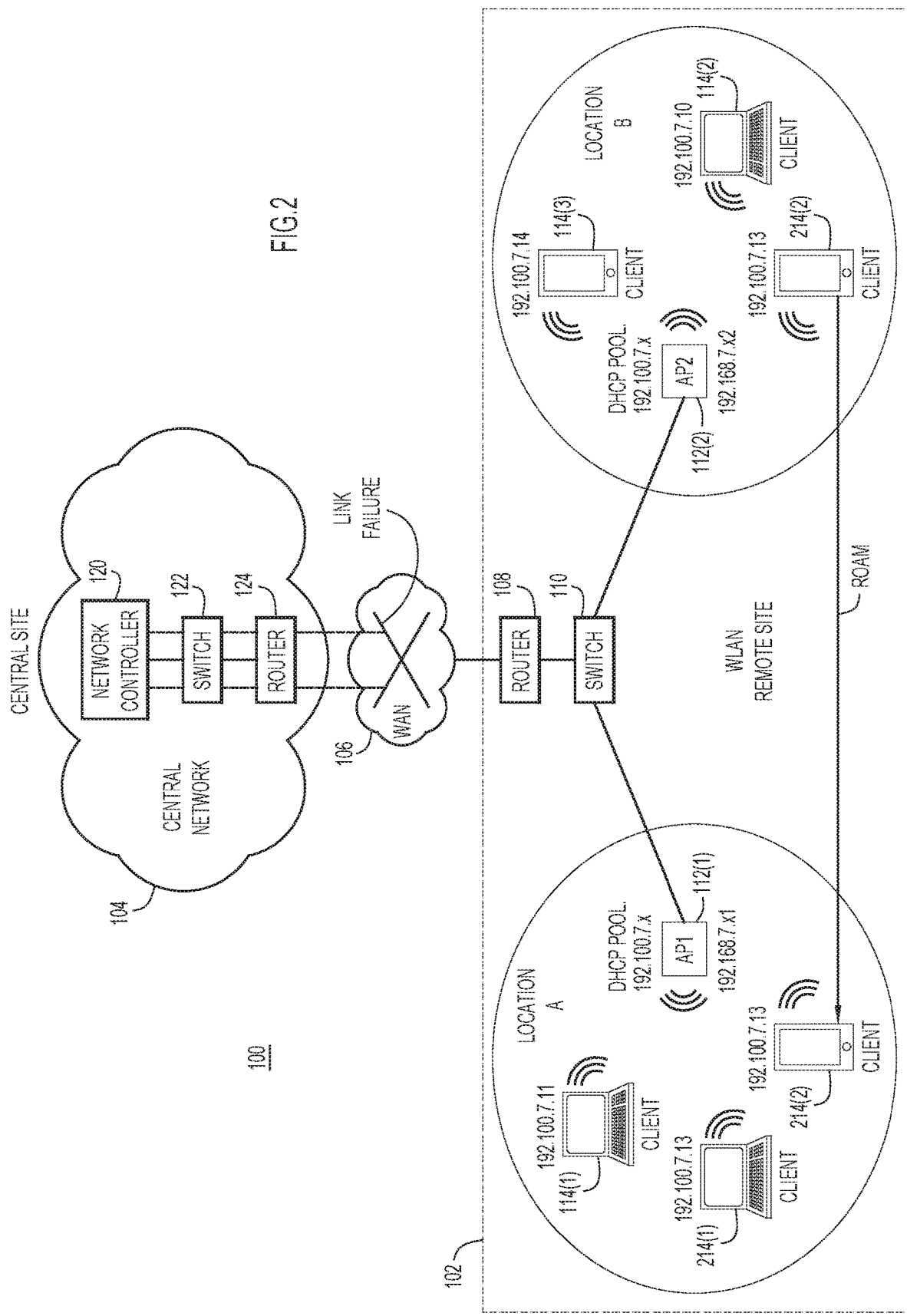
FIG. 2 is an illustration of the network environment after the network controller loses connectivity with the APs, and the APs (not the network controller) begin to assign non-distinct/overlapping IP addresses to wireless client devices, according to an example embodiment.

With reference to FIG. 2, there is an illustration of network environment 100 after network controller 120 has configured WLAN 102 as shown in FIG. 1, but both of APs 112 have lost connectivity with the network controller due to a link failure X between the network controller and the APs, and the APs have begun to operate independently of the network controller to assign overlapping (and thus colliding) IP addresses to wireless clients 114. Link failure X represents any link failure in the path between network controller 120 and APs 112, which may also include a failure of network controller 120. In the scenario of FIG. 2, APs 112 detect the loss of connectivity based on an absence of the above-mentioned monitored heart-beat messages sent from network controller 120. Upon detecting the loss in connectivity, each AP 112(*i*) transitions to a standalone mode. In the standalone mode, each AP 112(*i*) no longer operates under control of network controller 120, and the central DHCP server hosted on or relayed by the network controller is no longer able to assign IP addresses to wireless clients connecting with AP 112(*i*).

Instead, in the standalone mode, each AP 112(i) independently executes a local DHCP server hosted on the AP. Each AP 112(i) (through the local DHCP server) derives from the IP address assigned to the AP a local pool of IP addresses to assign to wireless clients served by the AP, without intervention from/interaction with network controller 120. In the example of FIG. 2, AP 112(1) derives a first pool 192.100.7.x of IP addresses (where x is an 8-bit value) from IP address 192.168.7.x1, while AP 112(2) derives a second pool of IP addresses 192.100.7.x from IP address 192.168.7.x2. The first and second pools share the same prefix 192.100.7 and thus include overlapping IP addresses, i.e., the first pool includes at least some IP addresses that are the same as at least some of the IP addresses in the second pool. The fact that the two pools include overlapping IP addresses can cause IP address collisions, as described below with continued reference to FIG. 2.

As shown in FIG. 2, a new wireless client 214(1) connects with AP 112(1) at location A. As a result of a DHCP request for an IP address received from new wireless client 214(1), the local DHCP server hosted on AP 112(1) assigns to the new wireless client IP address 192.100.7.13 from the first pool of IP addresses 192.100.7.x. Also, a new (mobile) wireless client 214(2) connects with AP 112(2) at location B. As a result of a DHCP request for an IP address received from new (mobile) wireless client 214(2), the local DHCP server hosted on AP 112(2) assigns to the new (mobile) wireless client IP address 192.100.7.13 from the second pool of IP addresses 192.100.7.x. Thus, the IP addresses assigned to both of new wireless clients 214(1) and 214(2) are the same.

As indicated by an arrow labeled "ROAM" in FIG. 2, new (mobile) wireless client 214(2) roams from location B to location A and thus from AP 112(2) to AP 112(1). In other words, new (mobile) wireless client 214(2) disconnects from AP 112(2) and then connects to AP 112(1). The roam causes an IP address collision at AP 112(1) between the same IP addresses configured on new wireless client 214(1) and new (mobile) wireless client 214(2). The IP address collision resulted from assigning IP addresses from the first and second pools of IP addresses having the same IP subnet prefix and thus overlapping, non-orthogonal IP addresses.

With reference to FIG. 3, there is an illustration of network environment 100 in which embodiments presented herein avoid the IP address collision described above in connection with FIG. 2. The illustration of FIG. 3 corresponds to a scenario in which, initially, APs 112(1) and 112(2) receive from the local DHCP server on router 108 respective distinct IP addresses 192.168.6.5/24 and 192.168.6.3/24, establish connectivity with network controller 120, and transition to operating in their non-standalone modes.

Then, upon detecting losses of connectivity with network controller 120 due to failure X, APs 112(1) and 112(2) transition to their standalone modes. Network controller 120 plays no further role in assigning DHCP IP addresses to wireless clients in the scenario depicted in FIG. 3. Such assignments are handled independently and locally by APs 112 operating in their standalone modes.

While in the standalone mode, the local DHCP server hosted on AP 112(1) derives from distinct IP address 192.168.6.5 a first standalone (DHCP) pool of IP addresses 320(1) "192.6.5.x" on IP subnet 192.6.5 to be assigned to wireless clients served by the AP, without intervention from network controller 120. "x" may be set to any 8-bit value. Similarly, while in the standalone mode, the local DHCP server hosted on AP 112(2) derives from distinct IP address 192.168.6.3 a second standalone (DHCP) pool of IP addresses 320(2) "192.6.3.x" (x may be set any 8-bit value) on IP subnet 192.6.3 to be assigned to wireless clients served by the AP, without intervention from network controller 120. APs 112 derive their respective first and second standalone pools of IP addresses from their distinct IP addresses such that the IP addresses in each standalone pool are non-overlapping with, or orthogonal to, the IP addresses in the other standalone pool.

Each AP 112(i) (via the local DHCP server) derives from the respective distinct AP IP address its standalone pool of IP addresses using the following example operations. First, AP 112(i) generates from the distinct AP IP address a distinct IP subnet prefix for the standalone pool of IP addresses. For example, AP 112(i) concatenates the most-significant byte (MSB) of the AP IP address with the two least significant bytes (LSBs) of the AP IP address, effectively removing the $2^{nd}$ MSB from the AP IP address. For example, the IP subnet prefix for the first standalone pool is given by 198.6.5←198.6.5. Second, AP 112(i) adds to the standalone pool IP subnet prefix a 1-byte field "x" (i.e., 8-bits) that the AP sets to (i.e., AP populates with) a unique value for each wireless client requesting an IP address. For example, each individual IP address for the standalone pool is given by 198.6.5.x←198.6.5+x, where x is in the range 0-255; this operation essentially concatenates the end of the IP subnet prefix or the standalone pool with a variable valued byte.

In an alternative embodiment, each AP 112(i) may derive its respective standalone pool of IP addresses while operating in the standalone mode as soon as the AP receives its distinct IP address from router 108 or via manual configuration of the IP address. In the alternative embodiment, the standalone pool of IP address is initially set inactive, and remains inactive until the AP detects the loss in connectivity with network controller 120. Upon detecting the loss of connectivity, the AP activates the standalone pool of IP addresses for assignment to wireless clients as they connect with the AP.

Armed with their non-overlapping, respective, standalone pools 320(1) and 320(2) of (DHCP) IP addresses, APs 112(1) and 112(2) assign IP addresses from their respective standalone pools to wireless clients served by the APs, as the wireless client devices connect to the APs, as shown in FIG. 3. Specifically, AP 112(1) assigns IP address 192.6.5.13 (i.e., x=13) from standalone pool 320(1) (192.6.5.x) to wireless client 314(1). Similarly, AP 112(2) assigns IP addresses 192.6.3.10 (i.e., x=10) and 192.6.3.13 (i.e., x=13) from standalone pool 320(2) (192.6.3.x) to wireless clients 314(2) and 314(3), respectively. Thus, the IP addresses assigned by AP 112(1) to its wireless client and the IP addresses assigned by AP 112(2) to its wireless clients are all different from each other because each AP 112(i) selected IP addresses from its distinct standalone pool of IP addresses that are non-overlapping with respect to the IP addresses of the other standalone pool.

Advantageously, when wireless client 314(3) roams from location B to location A and thus from AP 112(2) to AP 112(1) as indicated by the arrow labeled "ROAM" in FIG. 3, no IP address collision results at AP 112(1) because the IP addresses configured on wireless clients 314(3) and 314(1) are different by virtue of the fact that they were assigned from different, non-overlapping standalone pools 320(2) and 320(1) of IP addresses, respectively.

With reference to FIG. 4, there is an illustration of an example method of deriving non-overlapping standalone (i.e., "local") DHCP pools pool 1, pool 2, and pool 3 of IP addresses for three APs AP1, AP2, and AP3. Each AP uses the last 3 bytes (3 LSBs) of the distinct AP IP address assigned to that AP as a prefix for the local DHCP pool for the AP. Then, the AP adds to the prefix a variable x (e.g., 8-bit field) set to a given value within a range of 254 possible values to produce the different IP addresses to be assigned to wireless clients.

With reference to FIG. 5, there is an illustration of another example method of deriving non-overlapping local DHCP pools pool 1, pool 2, and pool 3 of IP addresses for three APs AP1, AP2, and AP3. Each AP uses "10" (private address) as a first byte, and adds the last two bytes from the distinct AP IP address to create a prefix for the local DHCP pool. Then, the AP adds to the prefix a variable x (e.g., 8-bit field) set to a given value within a range 254 possible values to produce the different IP addresses to be assigned to wireless clients.

The DHCP pools pool 1, pool 2, and pool 3 provide non-overlapped addresses and ensure that wireless clients to which pool IP addresses are assigned do not cause IP address collisions when roaming between AP1 and AP2 or AP3. Because the wireless client network traffic undergoes NAT/PAT at each AP, the AP translates all of the client traffic into its own IP address and maps the traffic into one of the APs UDP or TCP ports before sending the traffic to WAN 106.

For example, in the example of FIG. 5, client 10.255.101.9 from AP1 is now on AP2, and the NAT/PAT translation will perform the following for the upstream traffic:
Wire⇐172.31.255.102 UDP source port 6584⇐AP2⇐10.255.101.9 UDP source port 6899⇐wireless client.

On the reverse path, the AP maintains the translation mapping and translates the response back to the IP address of the client originating the traffic, as follows:
Wire⇒172.31.255.102 UDP destination port 6584⇒AP2⇒10.255.101.9 UDP destination port 6899⇒wireless client.

In another embodiment, the IP subnet prefix of each DHCP pool may include a partial byte of a MAC address of the AP. For example, the distinct IP subnet prefix of each DHCP includes a portion of the distinct IP address assigned to the AP and a portion of the MAC address of the AP. The portion of the MAC address may include one or more portions of an organizational Unique Identifier of the first 24 bits of the MAC address.

It is understood that the aforementioned examples of deriving, based on distinct IP addresses, distinct standalone pools of IP addresses that operate on distinct standalone IP pool subnets, are non-limiting, and there are many other ways of deriving such distinct pools, as would be appreciated by one of ordinary skill in the art having read the present description.

Figure 6:
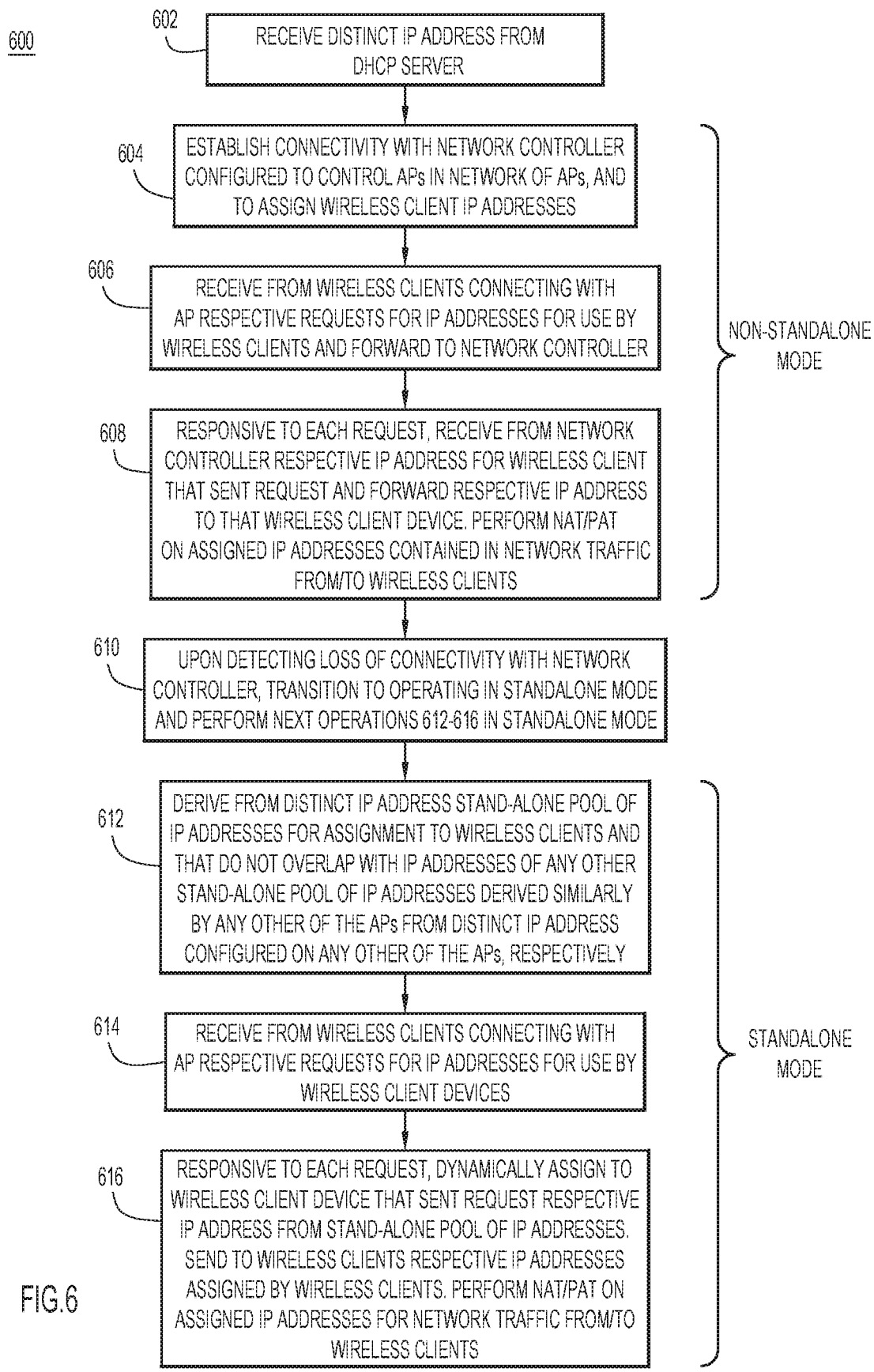
FIG. 6 is a flowchart of a method of deriving and using non-overlapping local DHCP IP address pools performed by each AP of the network environment, according to an example embodiment.

FIG. 6 is a flowchart of an example method 600 of deriving and using standalone or local DHCP IP address pools performed by each of APs 112. Method 600 is described with reference primarily to AP 112(1), but the method applies equally to other APs in the network of APs, e.g., to AP 112(2).

At 602, AP 112(1) sends a request for an IP address to network router 108, and receives a distinct (AP) IP address from the router.

At 604, AP 112(1) establishes connectivity with network controller 120 and enters/transitions to operating in a non-standalone mode after establishing the connectivity. Network controller 120 is configured to control APs 112 in the network of APs, and to assign to wireless clients 114 connecting with the APs IP addresses responsive to DHCP requests from the wireless clients.

At 606, AP 112(1) receives from wireless clients connecting with the AP respective requests for IP addresses for use by the wireless clients, and forwards the requests to network controller 120. AP 112(1) receives from network controller 120 for each request a respective IP addresses for the wireless client to which the request pertains, and forwards the IP address to the wireless client. Essentially, AP 112(1) acts as a DHCP relay between the wireless clients and network controller 120.

At 608, AP 112(1) performs NAT/PAT on IP addresses in network traffic transiting the AP, e.g., that is (i) sent from the wireless clients to WAN 106, and (ii) sent from the WAN to the wireless clients.

At 610, upon detecting a loss of connectivity with network controller 120, AP 112(1) transitions to a standalone mode (which is mutually exclusive with respect to the standalone mode), and performs next operations 612-616 while operating in the standalone mode. AP 112(1) may invoke a local DHCP server to perform the IP address-related operations described below.

At 612, AP 112(1) derives from its distinct IP address a standalone pool of IP addresses (e.g., DHCP IP addresses) for assignment to wireless clients and that do not overlap with IP addresses of any other standalone pool of IP addresses derived similarly by any other of the APs (e.g., in the AP network) from the distinct IP address configured on the any other of the APs. AP 112(1) activates the standalone pool of IP addresses for use by the AP in the standalone mode.

In the alternative embodiment (as mentioned above in connection with FIG. 3), AP 112(1) may (i) derive the standalone pool of IP addresses while the AP operates in the non-standalone mode as soon as the AP receives its distinct IP address from router 108 at operation 604, and (ii) only activate the standalone pool for use in the standalone mode upon detecting the loss of connectivity at operation 610. In yet another embodiment, the APs may operate in the standalone mode from the moment they power-on and boot-up without ever connecting to the network controller, and while in the standalone mode directly serve wireless clients with their distinct derived pools of IP addresses. In this operational scenario, the transition from non-standalone to standalone mode is not required.

At 614, AP 112(1) receives from wireless clients connecting with the AP respective requests for IP addresses for use by the wireless client devices.

At 616, responsive to each request, AP 112(1) dynamically assigns to the wireless client devices that sent the requests respective, different IP addresses from the standalone pool of IP addresses, and sends the IP addresses to the wireless client devices.

Also AP 112(1) performs NAT/PAT on the assigned IP addresses for network traffic from/to the wireless clients.

If/when AP 112(1) detects that it has re-established connectivity with network controller 120, the AP transitions from the standalone mode to the non-standalone mode, deactivates the standalone pool of IP addresses so that the AP will not use them in the standalone mode, and method 600 repeats.

Figure 7:
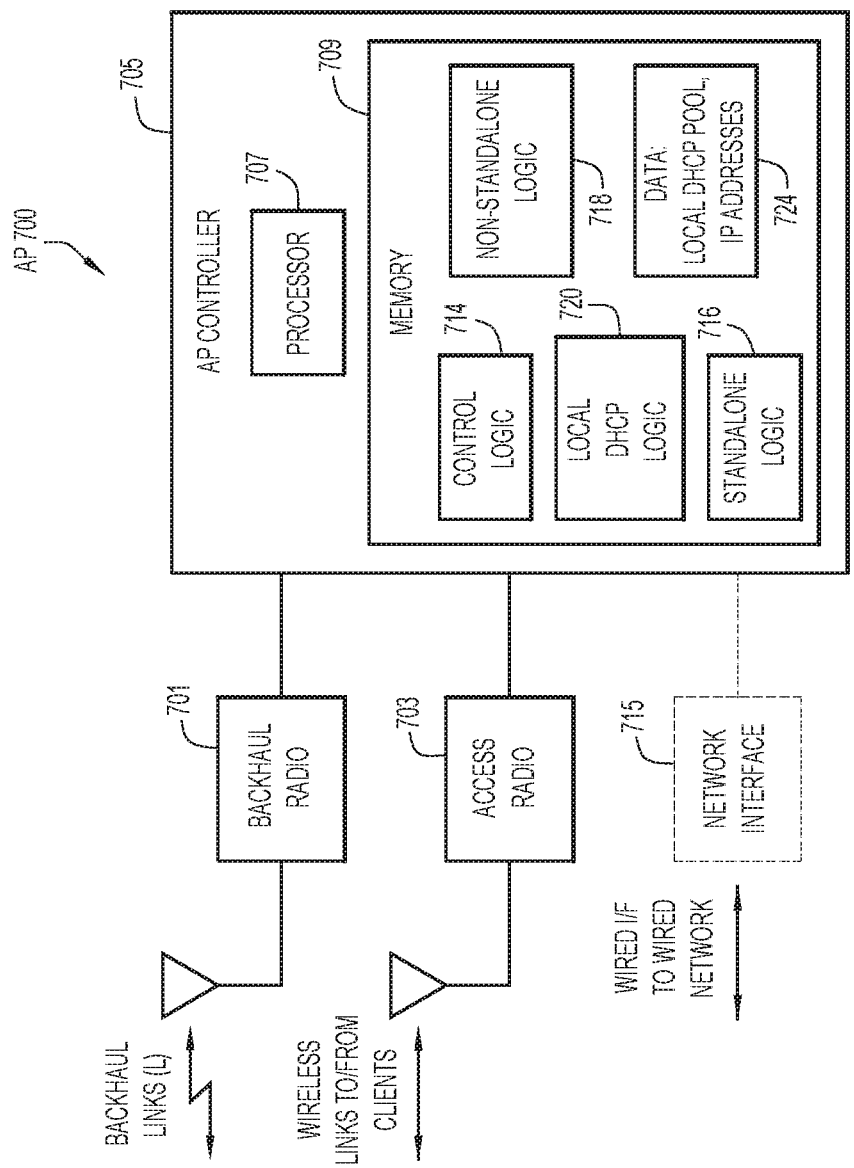
FIG. 7 is a block diagram of a wireless AP from the network environment, according to an example embodiment.

With reference to FIG. 7, there is shown a block diagram of an example AP 700 configured to perform operations according to techniques provided herein. AP 700 represents any of APs 112. AP 700 includes a wireless backhaul radio 701 (also referred to a transmitter/receiver or "transceiver" 701) to support wireless backhaul links, a wireless access radio 703 to support access for wireless clients served by the AP, and an AP controller 705 to which the backhaul and access radios are coupled. In an embodiment, radios 701 and 703 are integrated into a single radio. Backhaul radio 701 may operate according to IEEE 802.11a in the approximately 5 Gigahertz band, and access radio 703 may operative according to IEEE 802.11b/g in the approximately 7.4 GHz band. Each radio includes a respective set of one or more antennas. AP 700 may include a wired network interface 715 that enables the AP to connect to wired network 104.

AP controller 705 includes a processor 707 and memory 709. Processor 707 is a microcontroller or microprocessor, for example, configured to execute software instructions stored in memory 709. Memory 709 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 709 may comprise one or more computer readable storage media (e.g., a memory device) encoded with software comprising computer executable instructions and when the software is executed (by processor 707) it is operable to perform the operations described herein. For example, memory 709 stores or is encoded with instructions for control logic 714 to perform overall control of AP 700 including switching between standalone and non-standalone modes responsive to network controller connectivity status. Control logic 714 may include standalone logic 716 to implement standalone operations, non-standalone logic 718 to implement non-standalone operations, and a local DHCP server 720. Logic modules 716, 718, and 720 are depicted as separate and distinct in FIG. 7 for purposes of convenience; however, it is to be understood that portions of each of logic modules 716, 718, and 720 may be, in practice, incorporated into control logic 714.

Memory 709 also stores information/data 724 used and generated by logic 714-720, including, but not limited to, AP IP addresses, and local DHCP pools of IP addresses.

Embodiments presented herein dynamically generate a DHCP pool of IP addresses per AP based on a distinct IP address assigned to the AP (i.e. AP IP addresses). Since wireless clients usually only roam between nearby APs and nearby APs usually are on the same IP subnet, the last bytes of the AP IP addresses of the APs are different. Therefore, the embodiments use distinct AP IP addresses to derive orthogonal DHCP pools of IP addresses. The IP addresses in the pool may also include in the IP subnet prefix a partial byte of a MAC address of the AP. For example, the embodiments may use the last 2 bytes of the AP IP address as the IP subnet prefix for the DHCP pool of IP addresses for assignment to the wireless clients. This ensures that wireless clients from nearby APs will be have different IP addresses and will not introduce IP address collisions when roaming. Because wireless client traffic undergoes NAT/PAT translation to UDP/TCP traffic of the AP, the assigned DHCP IP addresses for the wireless clients are not public facing and thus need only be unique for on a per client basis, i.e., for each client of the AP. This dynamic DHCP pool is automatically enabled for use whenever the AP switches into its standalone mode for NAT WLAN, and switches back to network controller central DHCP whenever the network controller is available. The embodiments do not require new configurations or commands, and is a seamless improvement to previous central DHCP control. Features of the embodiments include: deriving an orthogonal address pool per AP; dynamically switching between central and local address pools; using a local address pool for APs configured on a WLAN; and supporting clients of multiple IP subnets at the same time in a single WLAN.

In summary, in one form, a method is provided comprising: at an access point (AP) in a network of APs, each AP configured with a distinct Internet Protocol (IP) address with which to communicate with a wide area network (WAN), and each AP configured to connect wirelessly with wireless client devices seeking access to the WAN via the each AP: deriving, based on the distinct IP address, a standalone pool of IP addresses for assignment to wireless client devices, such that the IP addresses do not overlap with IP addresses of any other standalone pool of IP addresses derived similarly by any other of the APs based on the distinct IP address configured on the any other of the APs; and operating in a standalone mode, including: receiving from wireless client devices connected with the AP respective requests for IP addresses for use by the wireless client devices; and responsive to each request, dynamically assigning to the wireless client device that sent the request a respective IP address from the standalone pool of IP addresses.

In another form, an apparatus is provided comprising: network ports to communicate with one or more networks; and a processor of an access point (AP) configured to operate in a network of APs, each AP configured with a distinct Internet Protocol (IP) address with which to communicate with a wide area network (WAN), and each AP configured to connect wirelessly with wireless client devices seeking access to the WAN via the each AP, the processor further configured to: derive, based on the distinct IP address, a standalone pool of IP addresses for assignment to wireless client devices, such that the IP addresses do not overlap with IP addresses of any other standalone pool of IP addresses derived similarly by any other of the APs based on the distinct IP address configured on the any other of the APs; and while operating the AP in a standalone mode: receive from wireless client devices connected with the AP respective requests for IP addresses for use by the wireless client devices; and responsive to each request, dynamically assign to the wireless client device that sent the request a respective IP address from the standalone pool of IP addresses.

In yet another form, a computer readable medium is provided. The computer readable medium stores instructions that, when executed by a processor of an access point (AP) in a network of APs, each AP configured with a distinct Internet Protocol (IP) address with which to communicate with a wide area network (WAN), and each AP configured to connect wirelessly with wireless client devices seeking access to the WAN via the each AP, cause the processor to perform: deriving, based on the distinct IP address, a standalone pool of IP addresses for assignment to wireless client devices, such that the IP addresses do not overlap with IP addresses of any other standalone pool of IP addresses derived similarly by any other of the APs based on the distinct IP address configured on the any other of the APs; and operating the AP in a standalone mode, including: receiving from wireless client devices connected with the AP respective requests for IP addresses for use by the wireless client devices; and responsive to each request, dynamically assigning to the wireless client device that sent the request a respective IP address from the standalone pool of IP addresses.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

at an access point (AP) in a network of APs, each AP configured with a distinct Internet Protocol (IP) address with which to communicate with a wide area network (WAN), the distinct IP addresses having (i) a common IP subnet prefix such that all of the APs in the network operate on a common IP subnet, and (ii) different least significant byte portions with respect to each other, and each AP configured to connect wirelessly with wireless client devices seeking access to the WAN via the each AP, performing, by the AP:

deriving from the distinct IP address a distinct IP subnet prefix for a standalone pool of IP addresses for assignment to wireless client devices, such that the IP addresses of the standalone pool of IP addresses are on a distinct IP subnet relative to, and do not overlap with, IP addresses of any other standalone pool of IP addresses derived similarly by any other of the APs based on the distinct IP address configured on the any other of the APs; and operating in a standalone mode, including:

receiving from wireless client devices connected with the AP respective requests for IP addresses for use by the wireless client devices; and responsive to each request, dynamically assigning to the wireless client device that sent the request a respective IP address from the standalone pool of IP addresses, and sending the respective IP address to the wireless client device for use by the wireless client device to access the WAN.

2. The method of claim 1, further comprising, at the AP:

obtaining the distinct IP address from a Dynamic Host Configuration Protocol (DHCP) server or by manual configuration; and operating in a non-standalone mode after establishing connectivity with a network controller device configured to control the AP and assign IP addresses to wireless client devices via the AP.

3. The method of claim 2, further comprising, at the AP:

while operating in the non-standalone mode, detecting a loss of connectivity with the network controller device; and responsive to the detecting, transitioning to the operating in the standalone mode.

4. The method of claim 1, wherein the network of APs includes a common wireless local area network (WLAN) on which the APs operate.

5. The method of claim 1, wherein the deriving further includes concatenating the distinct IP subnet prefix with a multibit field to form different IP addresses of the standalone pool of IP addresses for the dynamically assigning.

6. The method of claim 1, wherein the deriving includes combining a portion of the distinct IP address with a portion of a media access control (MAC) address of the AP to produce the distinct IP subnet prefix.

7. The method of claim 1, wherein the operating in the standalone mode further includes performing the receiving and the dynamically assigning each in accordance with a DHCP protocol.

8. The method of claim 1, further comprising at the AP:

performing network address translation (NAT) on IP packets flowing from each wireless client device to the WAN including translating the IP address assigned to the wireless client device from the standalone pool of IP addresses to an IP address for the WAN.

9. The method of claim 1, wherein the operating in the standalone mode includes operating without interacting with a network controller configured to control the AP and dynamically assign IP addresses to the wireless client devices connected to the AP.

10. An apparatus comprising:

network ports to communicate with one or more networks; and a processor of an access point (AP) configured to operate in a network of APs, each AP configured with a distinct Internet Protocol (IP) address with which to communicate with a wide area network (WAN), the distinct IP addresses having (i) a common IP subnet prefix such that all of the APs in the network operate on a common IP subnet, and (ii) different least significant byte portions with respect to each other, and each AP configured to connect wirelessly with wireless client devices seeking access to the WAN via the each AP, the processor further configured to:

derive from the distinct IP address a distinct IP subnet prefix for a standalone pool of IP addresses for assignment to wireless client devices, such that the IP addresses of the standalone pool of IP addresses are on a distinct IP subnet relative to, and do not overlap with, IP addresses of any other standalone pool of IP addresses derived similarly by any other of the APs based on the distinct IP address configured on the any other of the APs; and while operating the AP in a standalone mode:

receive from wireless client devices connected with the AP respective requests for IP addresses for use by the wireless client devices; and responsive to each request, dynamically assign to the wireless client device that sent the request a respective IP address from the standalone pool of IP addresses, and send the respective IP address to the wireless client device for use by the wireless client device to access the WAN.

11. The apparatus of claim 10, wherein the processor is further configured to:

obtain the distinct IP address from a Dynamic Host Configuration Protocol (DHCP) server or by manual configuration; and operate the AP in a non-standalone mode after establishing connectivity with a network controller device configured to control the AP and assign IP addresses to wireless client devices via the AP.

12. The apparatus of claim 11, wherein the processor is further configured to:

while operating the AP in the non-standalone mode, detect a loss of connectivity with the network controller device; and responsive to the detecting, transition to the operating the AP in the standalone mode.

13. The apparatus of claim 10, wherein the processor is further configured to derive by concatenating the distinct IP subnet prefix with a multibit field to form different IP addresses of the standalone pool of IP addresses for the dynamically assign operation.

14. The apparatus of claim 10, wherein the processor is configured to operate the AP in the standalone mode by operating the AP without interacting with a network controller configured to control the AP and dynamically assign IP addresses to the wireless client devices connected to the AP.

15. A non-transitory computer readable medium encoded with instructions that, when executed by a processor of an access point (AP) in a network of APs, each AP configured with a distinct Internet Protocol (IP) address with which to communicate with a wide area network (WAN), the distinct IP addresses having (i) a common IP subnet prefix such that all of the APs in the network operate on a common IP subnet, and (ii) different least significant byte portions with respect to each other, and each AP configured to connect wirelessly with wireless client devices seeking access to the WAN via the each AP, cause the processor to perform:

deriving from the distinct IP address a distinct IP subnet prefix for a standalone pool of IP addresses for assignment to wireless client devices, such that the IP addresses of the standalone pool of IP addresses are on a distinct IP subnet relative to, and do not overlap with, IP addresses of any other standalone pool of IP addresses derived similarly by any other of the APs based on the distinct IP address configured on the any other of the APs; and operating the AP in a standalone mode, including:
receiving from wireless client devices connected with the AP respective requests for IP addresses for use by the wireless client devices; and
responsive to each request, dynamically assigning to the wireless client device that sent the request a respective IP address from the standalone pool of IP addresses, and sending the respective IP address to the wireless client device for use by the wireless client device to access the WAN.

16. The non-transitory computer readable medium of claim 15, further comprising instructions to cause the processor to perform:
obtaining the distinct IP address from a Dynamic Host Configuration Protocol (DHCP) server or by manual configuration; and
operating the AP in a non-standalone mode after establishing connectivity with a network controller device configured to control the AP and assign IP addresses to wireless client devices via the AP.

17. The non-transitory computer readable medium of claim 16, further comprising instructions to cause the processor to perform:
while operating the AP in the non-standalone mode, detecting a loss of connectivity with the network controller device; and
responsive to the detecting, transitioning to the operating the AP in the standalone mode.

18. The non-transitory computer readable medium of claim 16, wherein the network of APs includes a common wireless local area network (WLAN) on which the APs operate.

19. The non-transitory computer readable medium of claim 16, wherein the instructions to cause the processor to perform the deriving include instructions to cause the processor to perform concatenating the distinct IP subnet prefix with a multibit field to form different IP addresses of the standalone pool of IP addresses for the dynamically assigning.

20. The non-transitory computer readable medium of claim 16, wherein the deriving includes combining a portion of the distinct IP address with a portion of a media access control (MAC) address of the AP to produce the distinct IP subnet prefix.

* * * * *